United States Patent Office 3,646,076
Patented Feb. 29, 1972

3,646,076
PROCESS FOR ETHYNYLATING 17-KETO STEROIDAL PHENOLS
George C. Buzby, Jr., Philadelphia, and Herchel Smith, Bryn Mawr, Pa., assignors to American Home Products Corporation, New York, N.Y.
No Drawing. Filed June 2, 1970, Ser. No. 42,880
Int. Cl. C07c *169/08*
U.S. Cl. 260—397.5                        11 Claims

ABSTRACT OF THE DISCLOSURE

17α-ethynyl-13-(lower)alkylgona-(and 8-isogona)-1,3,-5(10)-trien-3,17β-diols and the Δ$^7$-, Δ$^{8(9)}$- and Δ$^{9(11)}$-dehydro analogs thereof are produced from the corresponding 3-hydroxy-17-ketone compounds by reaction with alkali metal (lower)alkoxide followed by reaction with lithium acetylide-ethylenediamine complex and regeneration of the steroidal phenolic function with acid. The products of the process are hormonally active, especially estrogenically and anti-lipemically active and also are useful as intermediates in the preparation of other hormonally active steroids.

---

This invention is concerned with the preparation of steroidal compounds useful in therapy and as intermediates for therapeutically useful compounds. More particularly, it relates to a new and useful process for the preparation of 17α-ethynyl - 13 - (lower)alkylgona-(and 8-isogona)-1,3,5(10)-trien-3,17β-diols and the Δ$^7$-, Δ$^{8(9)}$- and Δ$^{9(11)}$-dehydro analogs thereof from the corresponding 3-hydroxy-17-one steroids. Compounds of this invention are estrogenically and anti-lipemically active and are also useful as intermediates in the preparation of other biologically active steroids.

BACKGROUND OF THE INVENTION

Those skilled in the art of steroid chemistry often require means to ethynylate a 17-keto steroidal phenol. The prior art method employs an alkali metal, acetylene and large volumes of ammonia for the ethynylation of steroidal phenols (Inhoffen Ber-71-1024[1938]). This prior art method requires the use of large and cumbersome volumes of liquid ammonia and the use of an organic protective group which must be removed after completion of ethynylation. It would, therefore, be advantageous to provide a method of ethynylating a 17-keto steroidal phenol while avoiding the prior art drawbacks and using a readily (commercially) available, easily handled ethynylating agent and commonly used organic solvents. One well-known ethynylating agent is lithium acetylide-ethylenediamine complex which is used to ethynylate 17-keto steroids. See Fieser et al., Reagents for Organic Synthesis, John Wiley and Sons, Inc., 1967, p. 574. However, this ethynylating agent is not effective with steroidal phenols and one skilled in the art would expect that in order to ethynylate 17-keto-steroidal phenols, one would have to use an organic protective group to protect the hydroxyl function. However, it has now been found that steroidal phenols (such as the 3-hydroxy-17-keto-steroidal-phenols) can be readily ethynylated with lithium acetylide-ethylenediamine complex, when the phenolic hydroxy is in the alkali metal salt form. Following ethynylation, the phenolic hydroxyl group is regenerated by treatment of the compound with acid. Acid sensitive phenols (such as Δ$^{8(9)}$- steroids) can be regenerated with ammonium chloride. The present process is advantageous in that the ethynylating agent, although unstable to proton sources (such as a steroidal phenol), reacts smoothly and with surprising efficiency in the preferred alkali metal salt. The reaction of the ethynylating agent is totally inoperative on the free phenol itself.

It is, accordingly, a primary object of this invention to provide a means to ethynylate a 17-keto-3-hydroxy-phenolic-steroid.

It is, further, an object to provide a means to protect the 3-hydroxyl group in a 17-keto, A-ring aromatic steroid while the 17-keto group is ethynylated to provide a 17α-hydroxy-17β-ethynyl-grouping followed by regeneration of the 3-hydroxyl function.

It is another object of the instant invention to provide an improved process to obtain 17α-ethynyl-13-(lower)-alkylgona-(and 8-isogona)-1,3,5(10)-trien-3,17β-diols and the Δ$^7$-, Δ$^{8(9)}$- and Δ$^{9(11)}$- dehydro derivatives thereof useful for their estrogenic and anti-lipemic properties.

DESCRIPTION OF THE INVENTION

These and other objects of this invention are readily obtained by the practice of the instant invention which is, in essence: a process for the preparation of a 17α-ethynyl-13 - (lower)alkylgona-(and 8-isogona)-1,3,5(10)-trien-3, 17β-diol of Formula I

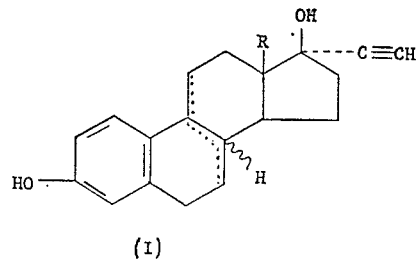

(I)

and the Δ$^7$-, Δ$^{8(9)}$- and Δ$^{9(11)}$- dehydro analogs thereof, wherein R is (lower)alkyl, the symbol (ξ) indicates α- or β-configuration, the dotted lines indicate optional unsaturation in said analogs, which comprises ethynylating at the 17-position of a corresponding 3-hydroxy-17-one steroid of Formula II

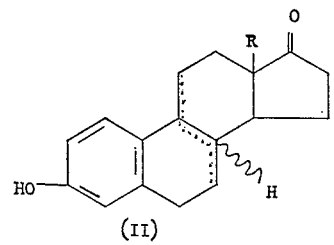

(II)

wherein R is as defined in Formula I by the steps of:
(a) Reacting said 3-hydroxy-17-one steroid with at least about one equivalent of an alkali (lower)-alkoxide in a (lower)alkanol medium until conversion of the 3-hydroxy group to the corresponding alkali metal salt anionic form is substantially complete;
(b) Displacing said (lower)alkanol medium with a polar inert organic solvent medium;
(c) Saturating the mixture of step (b) with acetylene;
(d) Reacting the acetylene saturated mixture of step (c) with at least about one equivalent of lithium acetylide-ethylenediamine complex until conversion of the 17-ketone group to a 17α-hydroxy and 17β-ethynyl group is substantially complete;
(e) Reacting the mixture of step (d) with at least about one equivalent of an acidic aqueous solution until said 3-hydroxy group is substantially regenerated; and
(f) Recovering the product of step (e).

Special mention is made of a number of important embodiments of the instant invention.
These are, respectively:
A process as next above defined wherein, in step (a) alkali metal (lower)alkoxide is sodium methoxide and said (lower)alkanol medium is methanol.

A process as first defined above wherein, in step (b) said polar inert organic solvent medium is dimethylsulfoxide.

A process as first defined above wherein, in step (c), said saturating is carried out by bubbling acetylene through the mixture of step (b) for from about ten minutes to about two hours.

A process as first defined above wherein step (d) is carried out at about ambient room temperature by mixing for from about one-half hour to about six hrours.

A process as first defined above wherein step (d) is carried out while the reaction mixture is in contact with acetylene.

A process as first defined above wherein, in step (e), said acidic aqueous solution comprises water and a member selected from the group consisting of hydrochloric acid and ammonium chloride.

A process as first defined above wherein d(+)-17α-ethylnylestradiol is prepared by:

(a) Reacting estrone with sodium methoxide in methanol;

(b) Removing the methanol by evaporation and vacuum distillation and adding dimethylsulfoxide;

(c) Saturating the mixture of step (b) with acetylene;

(d) Reacting the mixture of step (c) with lithium acetylide-ethylenediamine complex while contacting with acetylene;

(e) Reacting the mixture of step (d) with hydrochloric acid; and (f) Recovering the product by filtration and drying.

A process as first defined above wherein dl-17-α-ethynyl-estra-1,3,5(10),8-tetraene-3,17β-diol is prepared by:

(a) Reacting dl-3-hydroxyestra - 1,3,5(10),8 - tetraen-17-one with sodium methoxide in methanol;

(b) Removing the methanol by vacuum distillation and adding dimethylsulfoxide;

(c) Saturating the mixture of step (b) with acetylene;

(d) Reacting the mixture of step (c) with lithium acetylide-ethylenediamine complex while contacting with acetylene;

(e) Reacting the mixture of step (d) with aqueous ammonium chloride; and (f) Recovering the product by extracting the mixture of step (e) with ether and evaporating the ether extract.

A process as first defined above wherein dl-13-ethyl-3-hydroxy - 18,19 - di-nor-8α,17α-pregna-1,3,5(10)-trien-20-yn-17-ol is prepared by:

(a) Reacting dl-13-ethyl - 3 - hydroxy-8α-gona-1,3,5(10)-trien-17-one with sodium methoxide in methanol;

(b) Removing the methanol by vacuum distillation and adding dimethylsulfoxide;

(c) Saturating the mixture of step (b) with acetylene;

(d) Reacting the mixture of step (c) with lithium acetylide-ethylenediamine complex;

(e) Reacting the mixture of step (d) with hydrochloric acid; and (f) Recovering the product by extracting the mixture of step (e) with ether and evaporating the ether extract.

A process as first defined above wherein d-19-nor-17α-pregna-1,3,5(10),7-tetraen-20-yne-3,17-diol is prepared by:

(a) Reacting d-3-hydroxyestra-1,3,5(10),7-tetraen-17-one with sodium methoxide in methanol;

(b) Removing the methanol by vacuum distillation and adding dimethylsulfoxide;

(c) Saturating the mixture of step (b) with acetylene;

(d) Reacting the mixture of step (c) with lithium acetylide-ethylenediamine complex;

(e) Reacting the mixture of step (d) with aqueous ammonium chloride; and (f) Recovering the mixture of step (e) with ether and evaporating the ether extract.

In the specification and in the appeneded claims, the terms "(lower)alkyl," "(lower)alkanol," "(lower)alkoxide" and the like contemplate radicals containing saturated hydrocarbon groupings of straight or branched chain, having from about one to about six carbon atoms and includes, for example, the carbon atoms groupings designated methyl, ethyl, n-propyl, i-propyl, n-butyl, t-butyl, n-pentyl, n-hexyl, 3-methylpentyl and the like. The term "polar inert organic solvent medium" contemplates organic solvents which are polar in nature and are not susceptible to reaction with the herein described reactants under the herein described reaction conditions and are exemplified by, for example, dimethylsulfoxide, dimethylformamide, dimethylacetamide, ether, dioxane and the like. All temperatures stated herein or in the appended claims are in degrees centigrade, unless otherwise stated. The terms "reaction inert organic solvents" and "inert organic solvents" refer to organic solvents which dissolve reactants or substances but do not adversely affect their respective reacting or chemical properties.

Starting materials for Formula II are commercially available or can be readily prepared by techniques familiar to those skilled in the art. For example, estrone, a compound of Formula II wherein R is methyl, is an article of commerce. The 3-hydroxy-13-(lower)alkylgona-1,3,5 (10)-triene-17-ones of Formula II are prepared by means exemplified in U.S. Pat. 3,488,258 and U.S. Pat. 3,502,698. The 3 - hydroxy - 13 - (lower)alkyl-8-isogona-1,3,5(10)-triene-17-ones of Formula II are prepared by means exemplified in U.S. Pat. 3,407,217. The 3-hydroxy-13-(lower)alkyl-1,3,5(10),7-tetraene-17-ones of Formula II are prepared by means exemplified by R. P. Stein, G. C. Buzby, Jr. and H. Smith in copending U.S. Pat. application Ser. No. 760,212, filed Sept. 16, 1968 now U.S. Pat. No. 3,555,-015. The 3-hydroxy-13-(lower)alkylgona-1,3,5(10),8(9)-tetraene-17-ones of Formula II are prepared by means exemplified in U.S. Pat. 3,391,169. The 3-hydroxy-13-(lower)alkylgona-1,3,5(10),9(11)-tetraene - 17 - ones of Formula II are prepared by means exemplified in U.S. Pat. 3,391,170.

In carrying out step (a) of the instant process, the steroid of Formula II may be added to a mixture of the alkali metal (lower)alkoxide and the (lower)alkanol at any convenient temperature, e.g. from about 10° C. to about 50° C. or even higher. It is preferred to use at least about one equivalent amount of the alkali metal (lower)alkoxide, or a slight excess, e.g. up to about a 10% excess, based on the steroid starting material. The reaction forming the anion salt, especially at about 25° C., is quite rapid and is substantially complete almost instantaneously.

In carrying out step (b), displacement of the (lower)alkanol by the polar inert organic solvent, resort can be made to adding the solvent and fractionally distilling off the (lower)alkanol. However, especially in cases where the respective boiling points are close, it is preferred and convenient first to distill off the (lower)alkanol, then to suspend the residue in the desired volume of inert polar solvent.

In carrying out step (c), saturation is effected by bubbling through the mixture of step (b) acetylene gas, preferably acetylene gas that has been dried and prepurified such as by passing through a Dry Ice trap and a tower of anhydrous alumina. The bubbling of acetylene gas through the mixture is allowed to continue for from about ten minutes up to about two hours with stirring. Preferably, the saturation takes from about one-half hour to about one hour and may be carried out at any convenient temperature, i.e. from about 10° C. to about 50° C., or even higher, although ambient room temperature (about 25° C.) is acceptable and convenient.

In carrying out step (d), the amount of complex added is preferably at least about one equivalent of the steroid. However, an excess of up to about two equivalent weights or even more is found to promote a more efficient and smoother reaction. The reaction with the complex ethynylating agent takes place at a temperature ranging from about 10° C. up to about 100° C.; however, preferable results are obtained at about ambient room temperature (about 25° C.) when the mixture is stirred. The ethynylating reaction is allowed to continue for from about two to about six hours before proceeding to step (e). Preferred results are obtained when the lithium acetylide-ethylenediamine complex is added in separate portions during the reaction period whilst stirring is continued. The efficiency of the reaction may be favorably affected by the continued bubbling of acetylene gas through the reaction mixture during the reaction period.

After the ethynylation is complete, the phenolic hydroxy group is regenerated in step (e) by placing the reaction mixture of step (d) in contact with an aqueous acidic solution. This is best accomplished by pouring the reaction mixture of step (d) into water (or ice-water) which is made acidic with an acid such as hydrochloric acid, sulfuric acid, acetic acid or the like. In the case of acid sensitive steroids, ammonium chloride solution (10%) is used to regenerate the phenolic steroid. This regeneration is carried out at temperatures ranging from about 0° C. up to about 100° C. However, good results are obtained using cold solutions, about 10° C. The reaction is almost instantaneous.

After regeneration is complete, recovery of the product of Formula I according to step (f) is accomplished by conventional means. For example, if the product recrystallizer in the regeneration step is filtered off, washed with water and dried, it may then be recrystallized from an appropriate solvent or used to form a solvate (such as with toluene). One especially useful method is to extract the mixture of step (e) with an appropriate inert organic solvent (i.e. ether) followed by washing, drying and evaporating the extract leaving the product as a residue which may be recrystallized from an appropriate inert organic solvent (i.e. chloroform, isopropanol) or, if in the form of an oil, may be crystallized from an appropriate inert organic solvent (i.e. chloroform, dichloromethane, tetrahydrofuran). Recrystallization can then be effected from a lower alkanol, if desired.

The time and temperature ranges used in describing the aforementioned process steps simply represent the most convenient ranges consistent with carrying out the reaction in a minimum of time without undue difficulty. Thus, reaction temperatures appreciably below these can be used, but their use considerably extends the reaction time. Similarly, reaction temperatures higher than those mentioned can be employed with a concomitant decrease in reaction time, although purity of the product may be somewhat decreased.

The sources for the starting materials of Formula II have been specified hereinabove. Generally, all can be prepared by totally synthetic processes described by Douglas, Graves, Hartley, Hughes, McLoughlin, Siddall and Smith in J. Chem. Soc., 1963 pages 5077–94. In the product of a total synthesis which has not included a suitable resolution state the compounds prepared by the invention will be present as racemates. Using a convention approved by Fieser and Fieser, "Steroids," p. 336 (1959), the compounds designated as the $d$-forms are the enantiomers corresponding in configuration at C–13 to that of the natural hormone estrone. The corresponding enantiomorphs are consequently designated the $l$-forms and the racemates will be depicted by structural formulas which show only the enantiomorphs of the $d$-configuration.

As is mentioned hereinabove, the compounds of Formula I prepared by this process have estrogenic and antilipemic activity. This makes them useful to treat conditions in mammals responsive to treatment with estogenic drugs, such as, for example, menopause, senile vaginitis, kraurosis valvae, pruritis vulvae and the like. In addition, they are useful to lower blood lipid level of mammals and can be used whenever anti-lipemic agents are indicated, such as in the treatment of various hyperlipid aemias or where the incidence of atherosclerosis is to be minimized. The products prepared by the instant process are also useful as intermediates for the preparation of other steroids which have hormonal or other useful activities.

The products of Formula I prepared by this invention can be used in association with a pharmaceutically acceptable carrier. They can be formulated in liquid or solid forms, for instance as capsules, tablets, suppositories, powders, dispersible granules, cachets, and the like by combining them with conventional carriers. Such conventional carriers include magnesium carbonate or stearate, talc, sugar, lactose, pectin, dextrin, starch, gelatin, tragacanth, methyl cellulose, sodium carboxymethyl cellulose, low melting wax and cocoa butter. Diluents, flavoring agents, solubilizers, lubricants, suspending agents, binders or tablet-disintegrating agents can be used. Powders or tablets preferably contain 5 or 10 to 99% of the active constituent. The active steroid can be formulated with an encapsulating material with or without other carriers.

Liquid preparations such as solutions, suspensions or emulsions can also be used. Such preparations include dispersions in a pharmaceutically acceptable carrier such as arachis oil or sterile water, preferably containing a nonionic surface active agent such as fatty acid esters of polyhydroxy compounds, e.g., sorbitan, aqueous starch in sodium carboxymethylcellulose solutions, aqueous propylene glycol or polyethylene glycol. Thus a water-propylene glycol solution can be used for parenteral injection and aqueous suspensions suitable for oral use can be made by utilizing natural or synthetic gums, resins, methyl cellulose or other well-known suspending agents.

The composition can be in unit dose form in which the dose unit is, for instance, from about 0.01 to about 100 mg. of each active steroid. The unit dose form can be a packaged composition, e.g., packeted powder, vials or ampules or, for example, in the form of capsules, cachets or tablets or any number of these in packaged form. The pharmaceutical compositions can also consist substantially solely of the active steroid when this is in unit form. When used for the purposes stated above, the dosage of the compounds will vary with the condition being treated, but in general will be in the range established for ethynylestradiol [Merck Index, eighth edition, p. 443 (1968)].

Ethynylestradiol, one of the products prepared by this instant process can be used orally in a dose of about 0.05 mg. in estrogenic hormone therapy and is an art recognized effective therapeutic agent. See New and Nonofficial Drugs, 1962, p. 678–679, for medically recognized uses of ethynyl estradiol and dosage levels thereof.

Of course, as will be clear to those skilled in the art, in addition to compound designated by Formula II, the process broadly can be applied to obvious chemical equivalents thereof but differing therefrom in the sense of having other functional groups attached to the steroid nucleus, whenever such groups do not themselves interfere or become affected by the process, unless, in exceptional instances, this is a desired effect. Broadly stated, therefore, useful substrates would be represented by a 17-keto cyclopentopolyhydrophenanthrene nucleus monohydroxylated in its aromatic A-ring which, on ethynylation at the 17-position provides a product with antilipemic and estrogenic activity.

DESCRIPTION OF THE PREFERRED EMBODIMENTS

The following examples are given by way of illustration and are not to be construed as limitations of this invention, variations of which are possible without departing from the scope and spirit thereof.

EXAMPLE I $d(+)$-17α-ethynylestradiol

Estrone (2.0 g.) and sodium methoxide (0.432 g. or 1.2 equivalents) are dissolved in absolute methanol (60 ml.). The clear solution is taken to dryness on a rotary evaporator and the precipitated solid is pumped free of solvent on a vacuum pump. The solid is then dissolved in dry dimethylsulfoxide (50 ml.) and a stream of prepurified (by passage through a Dry Ice trap and a tower of anhydrous alumina) acetylene is bubbled through the solution for one-half hour with magnetic stirring. Then lithium acetylide-ethylenediamine complex (1.54 g.) is added as a solid. (This is 2.1 equivalents.) The reaction mixture is stirred for three hours in a stream of acetylene and then poured carefully with stirring into ice and water (~500 cc.). After the ice has melted the clear solution is acidified by dropwise addition of dilute aqueous hydrochloric acid. The precipitated solid is filtered and washed well with water. This product, after drying in a desiccator over phosphorus pentoxide, amounts to 1.55 g., m.r. 108–122° C. and is isolated as a hydrate with an undetermined number of moles of water. This material is dissolved in boiling toluene, the attendant water azeotroped off and the solution filtered hot. On standing, the product precipitates as a toluene solvate (1.40 g., 64% yield), M.R. 105–106° C. (sharp) with evolution of gas (toluene) in the range of 110–120° C. followed by re-solidification and final melting at 181–182° C. The literature gives a melting point of 182–183° C. for the stable, high melting, solvent free form of the product.

EXAMPLE II dl-17α-ethynylestra-1,3,5(10),8-tetrane-3,17β-diol

To a solution of sodium methoxide (2.0 g.) in methanol (100 ml.) is added dl-3-hydroxyestra - 1,3,5(10),8-tetraen-17-one (5.00 g.) with stirring followed by removal of the methanol in vacuo. The residue is triturated with benzene and then evaporated in vacuo and pumped dry. The residue is dissolved in dry DMSO (200 ml.), stirred and purified acetylene is bubbled through the solution for one hour. Lithium acetylide-ethylenediamine complex (2.5 g.) is added and the mixture stirred under acetylene for two and one-half hours. Then 2.5 g. more of lithium acetylide-ethylene is added with stirring for one and one-half hours, followed by pouring the reaction mixture into ice-water. Then solid ammonium chloride (100 g.) is added and the mixture is extracted well with ether. Washing, drying and evaporating the extract and crystallizing the resulting oil from chloroform provides the title product. Purifying the solid by treatment with decolorizing charcoal in tetrahydrofuran and recrystallization from chloroform gives 4.0 g. of the title product as chloroform solvate, M.P. 142–145° C.

EXAMPLE III dl-13-ethyl-3-hydroxy-18,19-dinor-8α,17α-pregna-1,3,5-(10)-trien-20-yn-17-ol, isopropanolate Suspend dl-13-ethyl-3-hydroxy - 8α - gona - 1,3,5(10)-trien-17-one (2.8 g.) in anhydrous methanol (~100 ml.). Add with stirring, sodium methoxide (0.65 g.), stir for fifteen minutes to give a clear yellow solution. Remove the solvent in vacuo. Triturate the residue in benzene and remove the solvent in vacuo. Dry the residue under vacuum. Triturate the dry powder in ether and filter, wash well with ether. Dissolve the powder in a 3-necked flask equipped with a drying tube and a gas inlet, in dry dimethylsulfoxide (~100 cc.) and saturate with dry acetylene gas with stirring for one hour. Add three aliquots (1 g., 1g. and 2 g.) of lithium acetylide-ethylenediamine complex at one hour intervals. Stir further two and one-half hours. Pour the mixture into ice-water. Acidify the mixture with dilute hydrochloric acid. Extract the mixture with ether and remove the solvent from the dry extract in vacuo. Dissolve the oil in dichloromethane, add charcoal and filter through Super Cel. Remove the solvent from the filtrate in vacuo. Recrystallize the residue from isopropanol and filter to get 2.0 g. of the title product, M.P. 195–198°.

$\lambda_{max}^{KBr}$ 2.95, 3.2μ.

Analysis.—Calcd. for $C_{21}H_{26}O_2 \cdot C_3H_8O$ (percent): C, 77.79; H, 9.25. Found (percent): 77.62; H, 9.51.

EXAMPLE IV

The procedure of Example II is repeated, substituting for dl - 3 - hydroxyestra - 1,3,5(10),8-tetraen-17-one, stoichiometrically equivalent amounts of the following steroidal phenols:

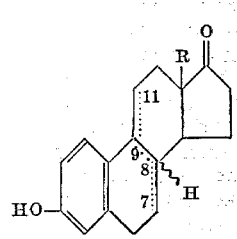

| R | C-8 | Δ⁷ | Δ⁸⁽⁹⁾ | Δ⁹⁽¹¹⁾ |
|---|---|---|---|---|
| CH₃ | C-H(α) | No | No | No |
| CH₃CH₂CH₂ | C-H(β) | No | No | No |
| (CH₃)₂CHCH₂ | C-H(β) | No | No | No |
| CH₃(CH₂)₄CH₂ | C-H(β) | No | No | No |
| CH₃CH₂ | | Yes | No | No |
| CH₃ | C-H(β) | No | No | Yes |
| CH₃ | | No | Yes | No | and the following 17α-ethynyl-17β-ol-steroidal phenols are respectively obtained:

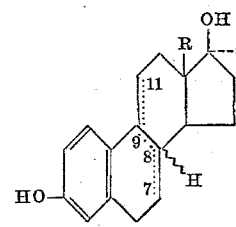

| R | C-8 | Δ⁷ | Δ⁸⁽⁹⁾ | Δ⁹⁽¹¹⁾ |
|---|---|---|---|---|
| CH₃ | C-H(α) | No | No | No |
| CH₃CH₂CH₂ | C-H(β) | No | No | No |
| (CH₃)₂CHCH₂ | C-H(β) | No | No | No |
| CH₃(CH₂)₄CH₂ | C-H(β) | No | No | No |
| CH₃CH₂ | | Yes | No | No |
| CH₃ | C-H(β) | No | No | Yes |
| CH₃ | | No | Yes | No |

EXAMPLE V d-19-Nor-17α-pregna-1,3,5(10),7-tetraen-20-yne-3,17-diol, hydrate

Suspend d-3-hydroxyestra - 1,3,5(10),7 - tetraen - 17-one in anhydrous methanol (~300 ml.). Add with stirring sodium methoxide (0.6 g.); stir to get a clear faint yellow solution. Remove the solvent in vacuo. Triturate the residue in benzene and remove the solvent in vacuo. Dry the residue under vacuum. Dissolve the dry residue in dry dimethylsulfoxide (~250 cc.). Saturate the green solution with dry acetylene gas, with stirring, for one hour. Add lithium acetylide-ethylenediamine complex (3.0 g.) in aliquots (1.5 g.) every one and one-half hours. Stir for further one hour. Pour the mixture into a solution of ammonium chloride (300 ml.; 10%) and let stand for twenty-four hours. Extract the mixture with ether. Remove the solvent from the dry extract in vacuo. Dissolve the residue in tetrahydrofuran, add charcoal and boil. Filter through Super Cel and remove the solvent from the filtrate in vacuo.

Recrystallize the residue from isopropanol to give the title product. Dry the product under vacuum at 60° C. Get 800 mg. of the product, M.P. 173–174° (presoftens at 150–160°). [a]_D= +101 (c=1, dioxane);

$\lambda_{max}^{KBr}$ 2.97, 3.09, 5.9μ

*Analysis.*—Calcd. for $C_{20}H_{22}O_2 \cdot \frac{3}{4} H_2O$ (percent): C, 78.01; H, 7.69. Found (percent): C, 77.9; H, 7.51.

Recrystallization from toluene gives better recovery.

What is claimed:
1. A process for the preparation of a 17α-ethnyl-13 - (lower)alkylgona - (and 8-isogona) - 1,3,5(10)-trien-3,17β-diol of the formula:

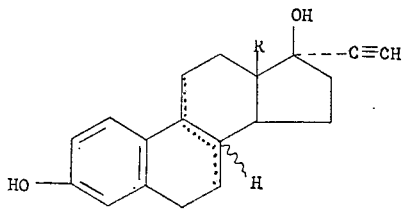

and the $\Delta^7$-, $\Delta^{8(9)}$- and $\Delta^{9(11)}$-dehydro analogs thereof, wherein R is (lower)alkyl, the symbol ($\xi$) indicates α- or β-configuration and the dotted lines indicate optional unsaturation in said analogs, which comprises ethynylating at the 17-position of a corresponding 3-hydroxy-17-one steroid compound of the formula:

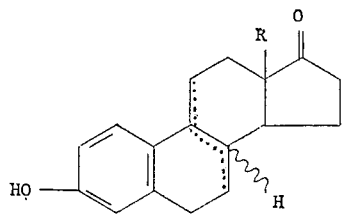

wherein R is an hereinabove defined by the steps of:
(a) reacting said 3 - hydroxy - 17 - one steroid with at least about one equivalent of an alkali metal (lower)alkoxide in a (lower)alkanol medium until conversion of the 3-hydroxy group to the corresponding alkali metal salt anionic form is substantially complete;
(b) displacing said (lower)alkanol medium with a polar inert organic solvent medium;
(c) saturating the mixture of step (b) with acetylene;
(d) reacting the acetylene saturated mixture of step (c) with at least about one equivalent of lithium acetylide-ethylenediamine complex until conversion of the 17-ketone group to a 17α-hydroxy and 17β-ethynyl group is substantially complete;
(e) reacting the mixture of step (d) with at least about one equivalent of an acidic aqueous solution until said 3-hydroxy group is substantially regenerate; and
(f) recovering the product of step (e).

2. A process as defined in claim 1 wherein, in step (a), said alkali metal (lower)alkoxide is sodium methoxide and said (lower)alkanol medium is methanol.

3. A process as defined in claim 1, wherein, in step (b), said polar inert organic solvent medium is dimethylsulfoxide.

4. A process as defined in claim 1 wherein, in step (c), said saturating is carried out by bubbling acetylene through the mixture of step (b) for from about ten minutes to about two hours.

5. A process as defined in claim 1 wherein step (d) is carried out at about ambient room temperature by mixing for from about ½ hour to about six hours.

6. A process as defined in claim 1 wherein step (d) is carried out while the reaction mixture is in contact with acetylene.

7. A process as defined in claim 1 wherein, in step (e), said acidic aqueous solution comprises water and a member selected from the group consisting of hydrochloric acid and ammonium chloride.

8. A process as defined in claim 1 wherein $d(+)$-17α-ethynylestradiol is prepared by:
(a) reacting estrone with sodium methoxide in methanol;
(b) removing the methanol by evaporation and vacuum distillation and adding dimethylsulfoxide;
(c) saturating the mixture of step (b) with acetylene;
(d) reacting the mixture of step (c) with lithium acetylide-ethylenediamine complex while contacting with acetylene;
(e) reacting the mixture of step (d) with hydrochloric acid; and
(f) recovering the product by filtration and drying.

9. A process as defined in claim 1 wherein dl-17α-ethynylestra - 1,3,5(10),8 - tetraene - 3,17β - diol is prepared by:
(a) reacting dl - 3 - hydroxyestra - 1,3,5(10),8 - tetraen - 17 - one with sodium methoxide in methanol;
(b) removing the methanol by vacuum distillation and adding dimethylsulfoxide;
(c) saturating the mixture of step (b) with acetylene;
(d) reacting the mixture of step (c) with lithium acetylide-ethylenediamine complex while contacting with acetylene;
(e) reacting the mixture of step (d) with aqueous ammonium chloride; and
(f) recovering the product by extracting the mixture of step (e) with ether and evaporating the ether extract.

10. A process as defined in claim 1 wherein dl - 13-ethyl - 3 - hydroxy - 18,19 - dinor - 8α,17α - pregna-1,3,5(10)-trien-20-yn-17-ol is prepared by:
(a) reacting dl - 13 - ethyl - 3 - hydroxy - 8α - gona-1,3,5(10) - trien - 17 - one with sodium methoxide in methanol;
(b) removing the methanol by vacuum distillation and adding dimethylsulfoxide;
(c) saturating the mixture of step (b) with acetylene;
(d) reacting the mixture of step (c) with lithium acetylide-ethylenediamine complex;
(e) reacting the mixture of step (d) with hydrochloric acid; and
(f) recovering the product by extracting the mixture of step (e) with ether and evaporating the ether extract.

11. A process as defined in claim 1 wherein d-19-nor-17α - pregna - 1,3,5(10),7 - tetraen - 20 - yne - 3,17-diol is prepared by:
(a) reacting d-3-hydroxyestra - 1,3,5(10),7 - tetraen-17-one with sodium methoxide in methanol;
(b) removing the methanol by vacuum distillation and adding dimethylsulfoxide;
(c) saturating the mixture of step (b) with acetylene;
(d) reacting the mixture of step (c) with lithium acetylide-ethylenediamine complex;
(e) reacting the mixture of step (d) with aqueous ammonium chloride; and
(f) recovering the mixture of step (e) with ether and evaporating the ether extract.

No references cited.

HENRY A. FRENCH, Primary Examiner

U.S. Cl. X.R.

260—999